United States Patent
Multani et al.

(10) Patent No.: US 10,025,943 B1
(45) Date of Patent: Jul. 17, 2018

(54) COMMIT AND ROLLBACK OF DATA STREAMS PROVIDED BY PARTIALLY TRUSTED ENTITIES

(71) Applicant: Amazon Technologies, Inc., Seattle, WA (US)

(72) Inventors: Lakhan Arya Multani, Agra (IN); Sachin Girdhar, Rohtak (IN)

(73) Assignee: Amazon Technologies, Inc., Seattle, WA (US)

( * ) Notice: Subject to any disclaimer, the term of this patent is extended or adjusted under 35 U.S.C. 154(b) by 674 days.

(21) Appl. No.: 14/513,070

(22) Filed: Oct. 13, 2014

(51) Int. Cl.
*G06F 21/00* (2013.01)
*G06F 21/62* (2013.01)
*G06Q 10/06* (2012.01)
*G06F 17/30* (2006.01)
*G06F 9/50* (2006.01)
*H04L 29/06* (2006.01)
*H04L 12/24* (2006.01)

(52) U.S. Cl.
CPC ........ *G06F 21/6218* (2013.01); *G06F 9/5072* (2013.01); *G06F 17/3007* (2013.01); *G06F 17/30336* (2013.01); *G06F 17/30356* (2013.01); *G06Q 10/06395* (2013.01); *H04L 41/04* (2013.01); *H04L 63/061* (2013.01)

(58) Field of Classification Search
None
See application file for complete search history.

(56) References Cited

U.S. PATENT DOCUMENTS

| | | | | |
|---|---|---|---|---|
| 9,262,643 | B2* | 2/2016 | Cidon | G06F 21/6218 |
| 2009/0216910 | A1* | 8/2009 | Duchesneau | G06F 9/5072 709/250 |
| 2013/0306276 | A1* | 11/2013 | Duchesneau | G06F 9/5072 165/104.21 |
| 2014/0013112 | A1* | 1/2014 | Cidon | G06F 21/6218 713/165 |
| 2014/0019497 | A1* | 1/2014 | Cidon | G06F 17/30194 707/827 |
| 2014/0019498 | A1* | 1/2014 | Cidon | G06F 17/3007 707/827 |

(Continued)

OTHER PUBLICATIONS

Yang, Hung-chih, et al. "Map-reduce-merge: simplified relational data processing on large clusters." Proceedings of the 2007 ACM SIGMOD international conference on Management of data. ACM, 2007.*

(Continued)

*Primary Examiner* — Gurkanwaljit Singh
(74) *Attorney, Agent, or Firm* — Davis Wright Tremaine LLP (57) ABSTRACT

A collection of key-value pairs may be maintained by a key-value database management system. Updates to the collection may be provided by a partially trusted entity. The updates to the collection may be stored in a series of transactions that are committed synchronously but associated with a second version of the collection of key-value pairs that is not immediately visible to a data consumer. The second version of the collection may initially be associated with an unaccepted state. The second version may be accepted and made available to the data consumer, or rejected and rolled back to the previous version.

20 Claims, 7 Drawing Sheets

(56) References Cited

U.S. PATENT DOCUMENTS

2016/0012465 A1* 1/2016 Sharp .................... G06Q 20/18
                                                     705/14.17
2016/0277374 A1* 9/2016 Reid ..................... H04L 63/061

OTHER PUBLICATIONS

Dominguez-Sal, David, et al. "Survey of graph database performance on the hpc scalable graph analysis benchmark." Web-Age Information Management(2010): 37-48.*

Bonnet, Laurent, et al. "Reduce, you say: What nosql can do for data aggregation and bi in large repositories." Database and Expert Systems Applications (DEXA), 2011 22nd International Workshop on. IEEE, 2011.*

Meijer, Erik, and Gavin Bierman. "A co-relational model of data for large shared data banks." Communications of the ACM 54.4 (2011): 49-58.*

* cited by examiner

COMMIT AND ROLLBACK OF DATA STREAMS PROVIDED BY PARTIALLY TRUSTED ENTITIES

BACKGROUND

Various interconnected applications may receive data transmitted by entities over which the operator of the interconnected application does not have direct control. In such cases, the quality of the data may not be immediately known. The operator of the interconnected application may therefore wish to impose some level of quality control over data received from entities other than the operator of the interconnected application.

Key-value databases may be employed in conjunction with interconnected applications. These may have advantages compared to conventional relational databases, due to various advantages such as improved scalability, availability, and performance. However, values inserted into a key-value database would generally be available to a consumer of the data prior to the imposition of quality control over the data.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Embodiments of the present disclosure may be applied in order to process collections of key-value data received from a partially trusted entity. Access to data supplied by a partially trusted data may be controlled, so that data-consuming entities, such as the users of an interconnected application, are permitted to access previously accepted versions of data, but not unaccepted versions. Embodiments may further associate data received from partially trusted entities into collections of key-value pairs, which may be accepted or rejected as a group. Alternatively, such collections may be split into accepted portions and rejected portions.

Embodiments may utilize collections of key-value pairs for various reasons, including logical relatedness of data in the collection. A partially trusted supplier of data may submit batches of related data over some time period. Each process batch may be processed by the key-value database as an individual transaction, but grouped into a larger collection of key-value pairs associated with a version number. The larger collection may be processed as a metatransaction, whose operation and semantics are described herein. In summary, a metatransaction may involve one or more committed transactions applied to a key-value data, where the data modified by the individual transactions are assembled into a larger collection that may be subject to a secondary "commit" phase. This may also be referred to as acceptance of the data in the collection. The collection may also be rolled back in its entirety, or split into multiple parts, each of which may each be accepted or rejected individually.

A key-value database may generally be described as a database management system in which data is stored and retrieved through the use of keys. Typically, a key-value database may accept requests to store data that comprises a value of a key (which may simply be referred to as a key) and one or more additional values that are associated with the key. Examples of key-value databases include "NoSQL" databases, which are referred to as such because they do not typically support the use of structured query language ("SQL").

Figure 1:
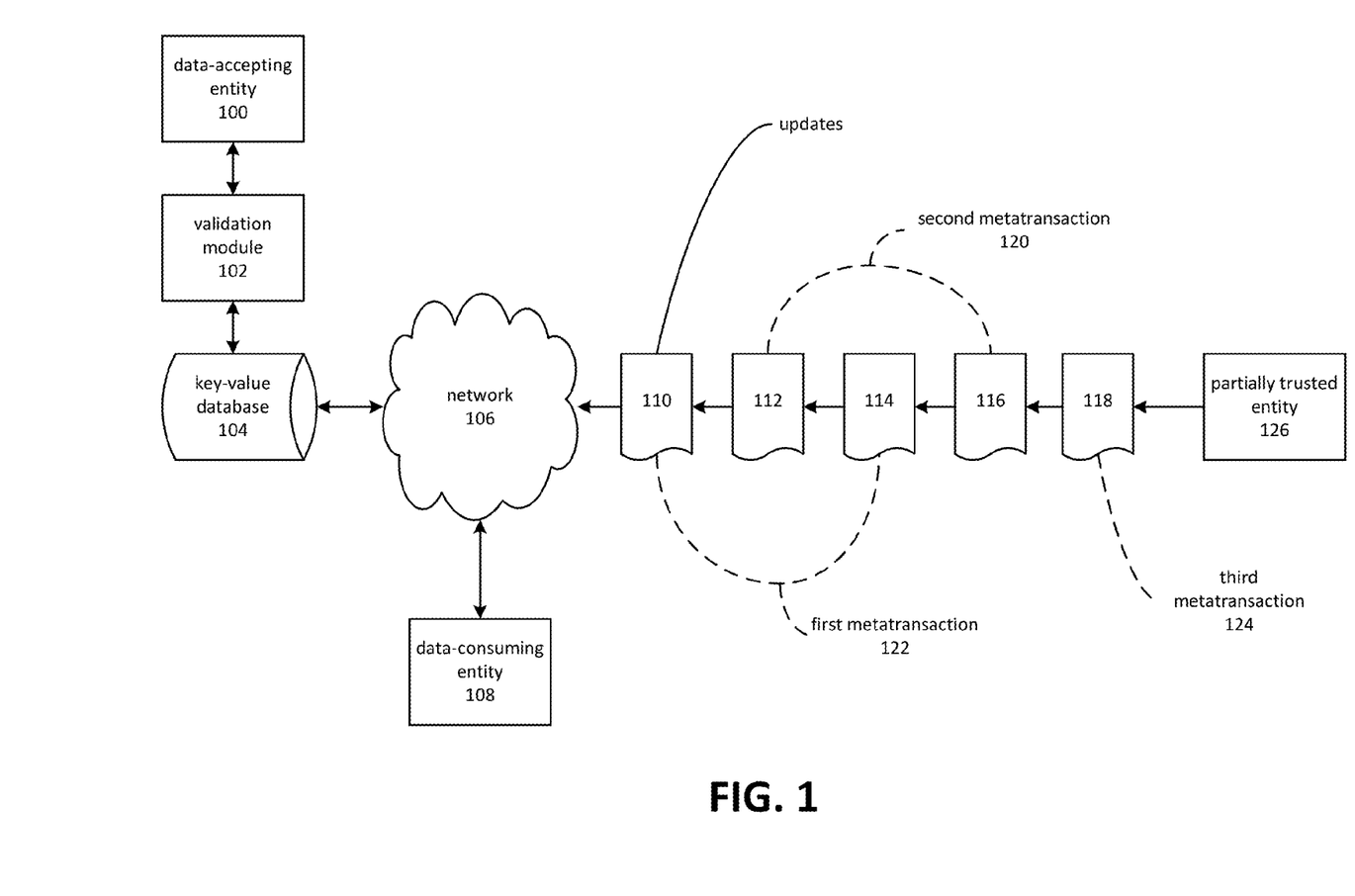
FIG. 1 is a block diagram depicting an embodiment of a system and method for performing a metatransactional commit or rollback on data received from a partially trusted entity.

FIG. 1 is a block diagram depicting an embodiment of a system and method for performing a metatransactional commit or rollback on data received from a partially trusted entity 126. A partially trusted entity 126 may be an organization or other entity supplying data that may be accessed by a data-consuming entity 108. Prior to such access, it may be desired that the data supplied by partially trusted entity 126 be validated, or otherwise accepted for use, by a data-accepting entity 100. A data-accepting entity 100 may be referred to as a trusted entity, referring to the trusted entity being entitled, authorized, or otherwise trusted to evaluate data received from a partially trusted entity 126 and to determine if the data should be accepted or rejected A partially trusted entity 126 may provide a sequence of updates 110-118, via network 106, to key-value database 104. Various intermediary processes (not shown) may facilitate the transmission of updates 110-118 to key-value database 104. In various embodiments, a computerized process may receive updates contained in messages or files transmitted by partially trusted entity 126. Updates 110-118 may be transmitted individually or in separate transmissions. In some embodiments, updates 110-118 may be transmitted as one or more files. A given file might correspond to a single update, such as update 118, or to multiple updates such as updates 118 and 116. A file may contain updates corresponding to a single complete metatransaction, such as third metatransaction 124, or updates corresponding to multiple whole or partial metatransactions, such as all of third metatransaction 124 and part of second metatransaction 120.

Updates 110-118 may be stored within the context of one or more transactions storing data on key-value database 104. A transaction may comprise storing data on a storage device (not shown) so that all of the data in the same transaction context is either stored within the key-value database 104, or none of the data is. In FIG. 1, each of updates 110-118 may be stored in a key-value database 104 within a single transaction, or combined into multiple transactions.

In contrast, a metatransaction may not necessarily have the atomicity of a normal transaction. Data related to a metatransaction may be rolled back or committed independently of other data stored as part of the same metatransaction. In FIG. 1, the scope of one transaction may be used for update 110, and the scope of another transaction may be used for update 112. A metatransaction, on the other hand, may incorporate a number of transactions. For example, a first metatransaction 122 may comprise updates 110 and 114, a second metatransaction 120 may comprise updates 112 and 116, and a third metatransaction 124 may comprise update 118. As depicted in FIG. 1, metatransactions (such as first metatransaction 122 and second metatransaction 120) may overlap in time.

Data associated with the same metatransaction may apply to a particular version of a collection of key-value pairs. A collection of key-value pairs may be an arbitrary or logically related set of key-value pairs. For example, a set of currency exchange rates might be logically associated with a collection of key-value pairs. A previous day's exchange rates might correspond to a first version of the collection, while today's exchange rates might correspond to a second version. The exchange rates might be supplied on an ongoing basis by partially trusted entity 126, but not made available until, for example, checking that the exchange rates are valid.

A data-consuming entity 108 may transmit a request to access data maintained in key-value database 104. In response, embodiments may cause data corresponding to a committed metatransaction to be returned to data-consuming entity 108. A committed metatransaction may pertain to data that has been validated or otherwise accepted through the actions of a validation module 102.

A validation module 102 may perform various operations related to validating the data, such as performing consistency checks. These operations may be performed on a metatransaction whose underlying transactions have been committed to key-value database 104, but that are not yet being made available to data-consuming entity 108. The metatransaction may be described as pending, uncommitted, or not accepted. Validation module 102 may direct the actions of validation module 102 by, for example, defining what consistency checks are to be performed.

In some cases and embodiments, a metatransaction may be split into two metatransactions, one of which may be rolled back and the other of which may be accepted, and therefore made accessible to data-consuming entity 108. A metatransaction may comprise a set of operations on a logically-related collection of key-value pairs. Embodiments that allow for partial acceptance or partial rollback of may perform various operations to control the logical completeness of a collection that is included in a metatransaction. These may include determining that the collection is acceptably complete without the partially rolled-back data, merging data into the collection in order to complete it, keeping the non-rolled back data in an unaccepted state until further updates are received, and so on.

Figure 2:
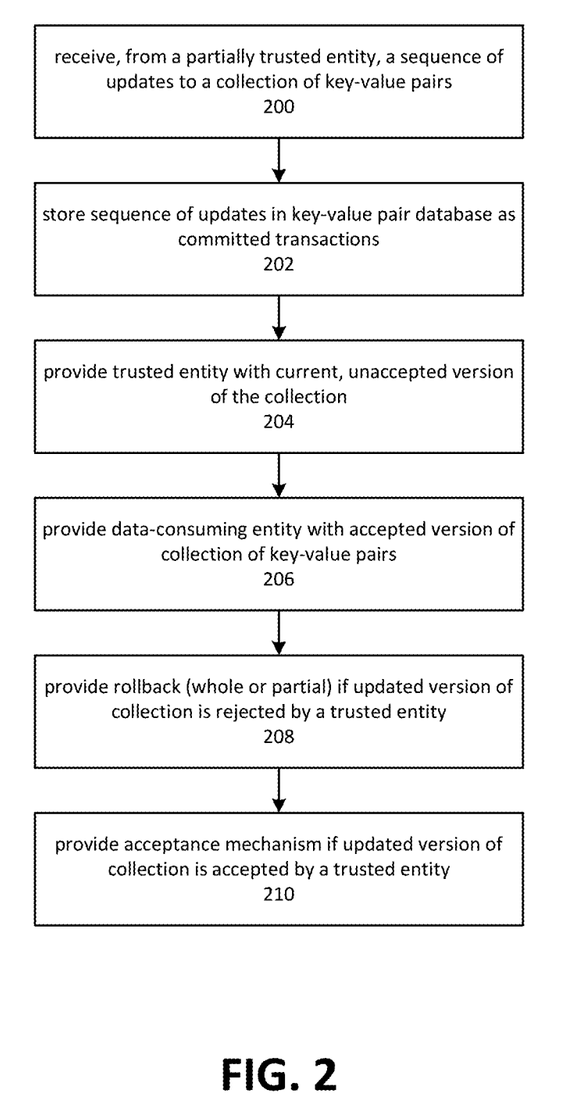
FIG. 2 is a flowchart depicting an embodiment of a process for applying a metatransaction to provide bifurcated access to collections of key-value pairs prior to acceptance or rollback of the metatransaction.

FIG. 2 is a flowchart depicting an embodiment of a process for applying a metatransaction to provide bifurcated access to collections of key-value pairs prior to acceptance or rollback of the metatransaction. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

As depicted by element 200, embodiments may receive a sequence of updates to a collection of key-value pairs maintained in a key-value database management system. The key-value database management system may maintain the collection on one or more storage devices, possibly utilizing various partitioning schemes to distribute data between storage devices. Embodiments may employ partitioning schemes that partition data between storage devices based on logical characteristics of the data, such as by the value of a key, or by using hash-based partitioning. Embodiments may further utilize secondary indexing or secondary key mechanisms to allow for range-based searches on the value of keys in a range. Embodiments may also utilize these mechanisms to permit range-based searches on portions of keys. These mechanisms may be utilized in conjunction with range-based searches of portions of an extended key, as described herein.

A sequence of updates may be received from a partially trusted entity. A partially trusted entity may include an organization, company, vendor, or other entity that provides data. A partially trusted entity may therefore also be described as a data-providing entity. It may be the case that the received data cannot be fully trusted. This may arise in a variety of situations, such as the fallibility of complex systems and human interactions therewith, data cleansing and uniformity problems, and so on. It may also be the case that the partially trusted entity, while trusted to the extent that the entity is permitted to submit updates to a collection of data, is otherwise considered untrustworthy or even a security risk.

The updates submitted by the partially trusted entity may comprise a sequence of updates to a collection of key-value pairs. The updates may comprise modifications to the previous version of a value, the addition of a new value, or the deletion of an existing value. An addition of a new value may be considered to be a modification to a null version of the key-value pair, and the deletion of a new value may be considered to be equivalent to setting the value to null. Embodiments may not necessarily maintain records corresponding to a null value, however.

As depicted by element 202, embodiments may store the sequence of updates in the key-value database as a sequence of committed transactions. For example, consider a metatransaction that comprises two updates to a collection of key-value pairs. Each one of the two updates may be stored as a committed transaction. This approach provides for flexibility due to the availability of the committed data to certain entities, such as a trusted entity. A trusted entity may utilize access to data that is committed at the transaction level, but not yet accepted at the metatransaction level.

Element 204 depicts an embodiment providing a trusted entity with access to the current, unaccepted version of the collection. In some cases and embodiments, a trusted entity may validate data in a metatransaction that has not yet been fully received—as might be the case, continuing the previous example, after the first update to the collection of key-value pairs has been received, but prior to the second update being received. In other cases and embodiments, a trusted entity may be provided with data corresponding to a metatransaction only after it has been completely received.

As depicted by element 206, embodiments may provide a data-consuming entity with access to an accepted version of a collection of key-value pairs. In other words, embodiments may restrict access, by a data-consuming entity, to data that corresponds to an accepted version of a collection of key-value pairs. This may typically be the most recent accepted version of the collection. As noted herein, a metatransaction may correspond to a version of a collection. A data-consuming entity may be provided with access to data that corresponds to an accepted metatransaction, which may typically correspond to a version of a collection of key-value pairs.

Element 208 depicts an embodiment providing a facility for rolling back a version of a collection that is rejected by a trusted entity. This may correspond to rolling back a metatransaction. The rolling back of a metatransaction does not require that any constituent transactions of the metatransaction be rolled back. A version of a collection may be wholly or partially rolled back, as described herein.

In various embodiments, a trusted entity may cause a version of a collection, or more generally a metatransaction which may include updates to one or more collections, to be accepted or rejected. The acceptance or rejection may, in some cases and embodiments, be in whole or in part. A trusted entity may cause a data-validating module to perform various validation operations on a version of a collection of data that has not yet been accepted. In some cases and embodiments, the acceptance process may not necessarily involve direct interaction with the trusted entity. In some cases and embodiments, interaction with the trusted entity may be involved. Embodiments may employ workflow processing mechanisms to facilitate the interaction.

As depicted by element 210, embodiments may provide a mechanism for applying an acceptance of the data as described in the preceding paragraph. An acceptance mechanism may cause data in the accepted version of the dataset to become visible to data-consuming entities. For example, the trusted entity may correspond to an operator of an e-commerce system, and the data-consuming entity may correspond to a customer. The respective entities might then comprise the e-commerce system and the customer's browsers. An accepted version of a collection of key-value pairs might then be made viewable, by the e-commerce system, for display in a browser.

Figure 3A:
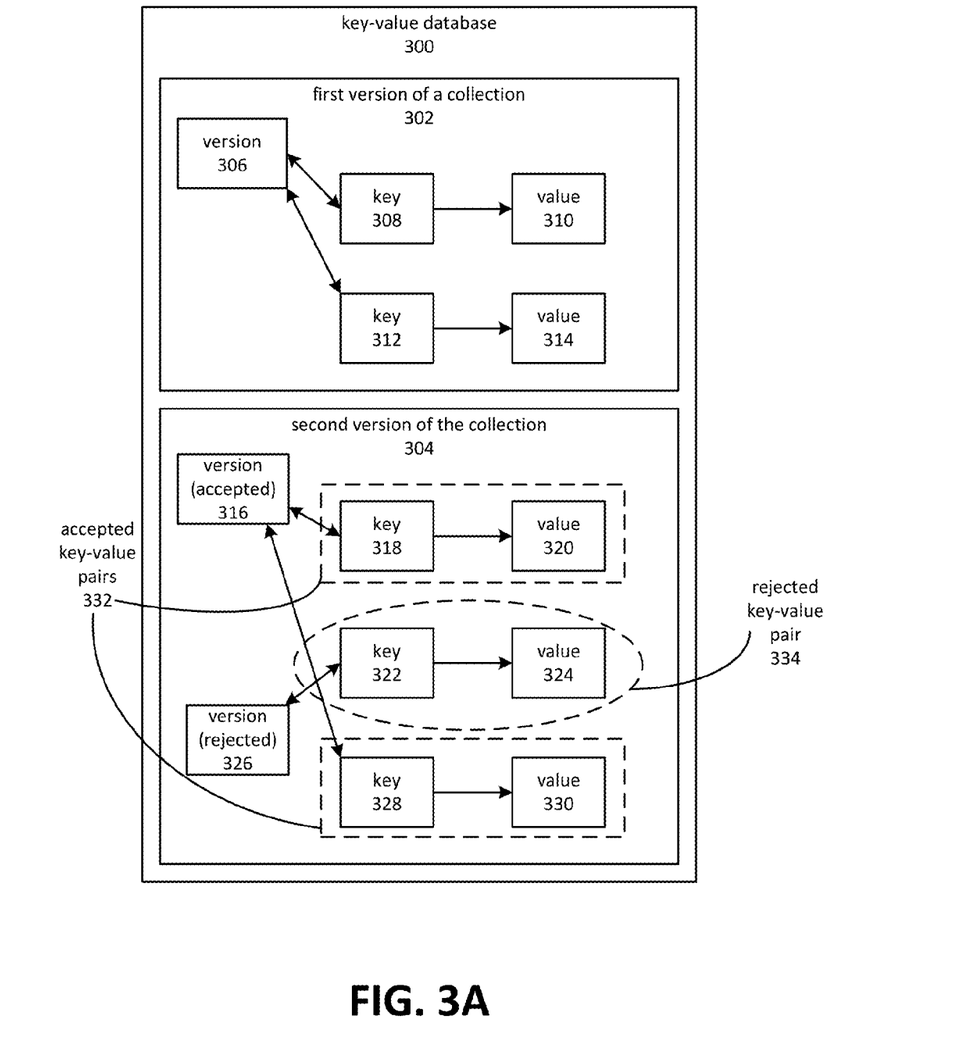
FIG. 3A depicts aspects of partially accepting and partially rolling back a second version of a collection of key-value pairs.

FIG. 3A depicts aspects of partially accepting and partially rolling back a second version of a collection of key-value pairs. A key-value database 300 may maintain a plurality of key-value pairs, such as key 308 paired with value 310, key 312 paired with value 314, key 318 paired with value 320, and so on. There may exist within the plurality of key-value pairs various logical groupings of keys. These groupings may be described as collections of key-value pairs. For example, key-value database 300 might contain a collection including key 308 paired with value 310 and key 312 paired with value 314. These may correspond to a first version of a collection 302. A collection may correspond to some logical basis for grouping its members, such as the key-value pairs within the collection pertaining to a similar concept, object, or entity.

Embodiments may receive updates to the first version of the collection, which may comprise additions to, deletions of, and modifications to key-value pairs in the first version of collection 302. A version 306 may comprise an identifier of the first version of the collection. Association with the first version may be recorded by association with keys 308. Embodiments may associate the updates with a second version of the collection 304. For example, the second version of the collection 304 might comprise key 318 paired with value 320, key 322 paired with value 324, and key 328 paired with value 330. Some of these might be overlap with members of first version of a collection 302. For example, key 318 might have the same value as key 308.

A version 316 may comprise an identifier of the second version of the collection 304. The identifier of version 316 may be associated with values in the collection by extending the corresponding keys. For example, an extended key might be formed from version 316 and key 318. An association between the extended key and value 320 might then be stored.

Initially, second version of the collection 304 may be associated with information indicative of an unaccepted state. This might be done, for example, by storing a record associating the identifier version 316 with information indicative of an unaccepted state for the corresponding version. While this is the case, embodiments may prevent a data-consuming entity from accessing key-value pairs in the second version of the collection 304. For example, an attempt to access value 320 corresponding to key 318 might instead result in value 310 being returned as the accessed value, assuming for the purposes of this example that key 318 and key 308 are equivalent.

Data in the second version of the collection 304 may be wholly or partially accepted, or wholly or partially rejected. The example of FIG. 3A depicts a subset of the second version of the collection 304 being accepted (accepted key-value pairs 322), and a subset being rejected (rejected key-value pair 334). Embodiments may record the partial acceptance of accepted key-value pairs 332 by continuing the association between version 316 and keys 318 and 328 and associating version 316 with an accepted state. In order to partially roll back rejected key-value pair 334, embodiments may associate key 322 with an identifier for a new version 326 and associate version 326 with a rejected state. As noted herein, embodiments may perform various operations to control the logical completeness of a collection prior to the collection being associated with an accepted state. For example, embodiments may ensure that a partially accepted collection of key-value pairs is logically consistent prior to associating the collection with an accepted state. In the case of a partial rollback, embodiments may, for example, have the remaining parts of the collection stay in an unaccepted state until it can be verified that the collection is in a logically-consistent state, until additional data is added to cause the collection to cause it to be logically consistent, and so forth.

Figure 3B:
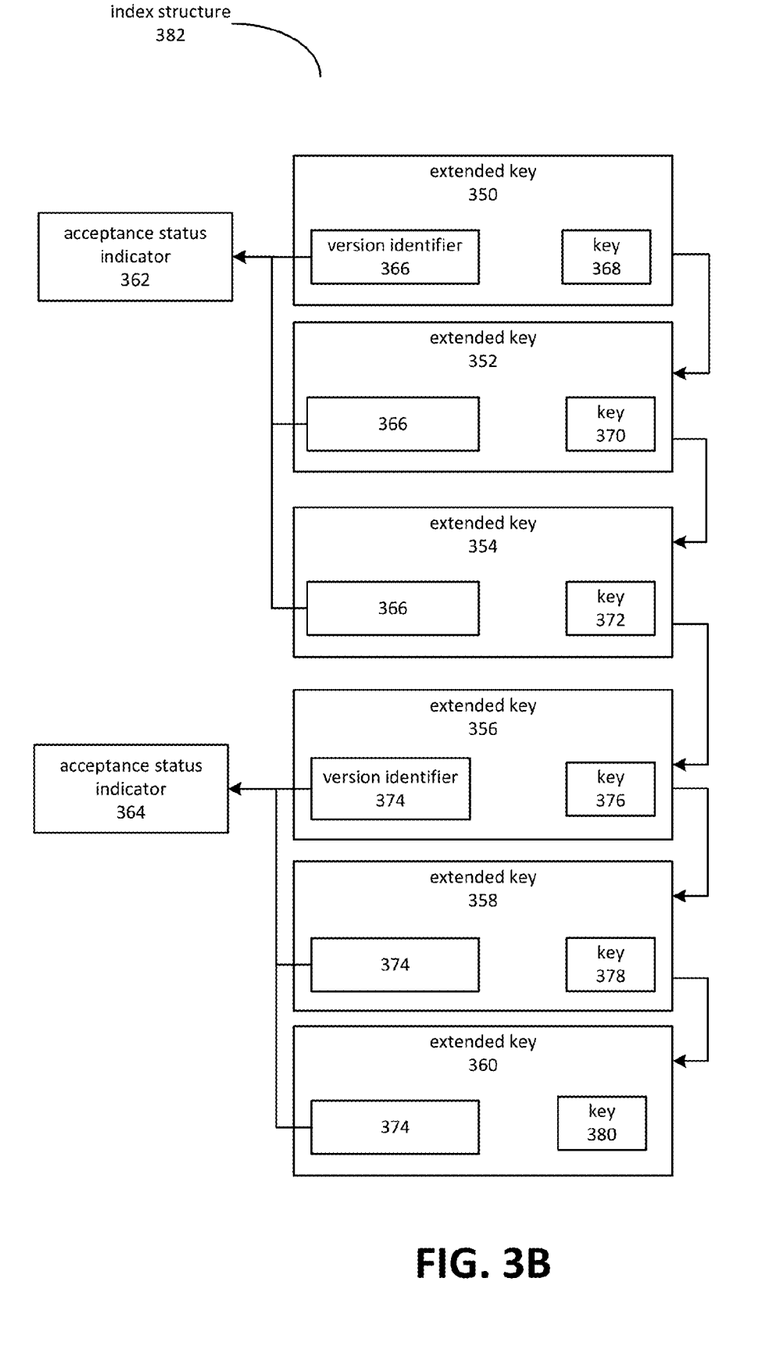
FIG. 3B depicts an example of a mechanism for locating values in an accepted version of a collection and for accepting or rejecting a version of a collection.

FIG. 3B depicts an example of a mechanism for locating values in accepted versions of a collection and for accepting or rejecting versions of a collection. Embodiments may maintain an index structure 382 on one or more storage devices. The index structure may be utilized to locate values corresponding to keys in a version of a collection of key-value pairs. In addition, status indicators may be identified, enabling determination of the acceptance status of a version of a collection, or more generally the status of the corresponding metatransaction.

An index structure 382 may comprise a traversable structure, such as a linked list, containing extended key entries. Index structure 382 may, in various embodiments, include index structures employed with distributed key-value database management systems. In addition, the structure depicted in FIG. 3B is intended to be illustrative of a mechanism for utilizing an extended key in an index structure. FIG. 3B should not, however, be viewed as limiting the scope of the present disclosure to embodiments employing the depicted structure. For example, a number of alternative structures may be employed, provided the alternative structure allows some means of identifying keys based on contents of the extended key.

An extended key 350 may comprise a version identifier 366 and a key 368. The version identifier 366 may correspond to a version of a collection of key-value pairs. For example, in FIG. 3B extended keys 350, 352, and 354 may correspond to and comprise the same value of a version identifier 366. For the illustrative purposes, version identifier 366 may correspond to a first version of a collection of data. Version identifier 374 may correspond to a second version of the collection, and a value corresponding to version identifier 374 may be included in extended keys 356, 358, and 360.

A mapping between version identifier 366 and acceptance status indicator 362 may be indicative of whether the corresponding version of a collection of key-value pairs has been accepted, rejected, or is unaccepted. The value of acceptance status indicator 362 may be updated to reflect a change in status. In some cases and embodiments, this may permit the collection of key-value pairs, or more generally a metatransaction, to be efficiently updated to reflect a change in status.

A data-consuming entity may be provided with a value associated with the latest version of a collection of key-value pairs that is associated with an accepted status. FIG. 3B depicts an example of a structure that may be utilized to provide such access. A request (not shown) to access a value may be accompanied by a key that is associated with the value, and which in conventional key-value database management systems would function as the identifier usable to locate the corresponding value. In various embodiments, a traversable structure, such as index structure 382, may be traversed to locate an extended key having as a constituent part the key provided in the request. Embodiments may employ various approaches to ordering versions of collections. For example, a version may be identified by a monotonically increasing value such as a serial number or timestamp, so that versions corresponding to larger values are considered to be the latest version. Various other approaches may be used.

Upon locating an extended key containing the key provided in the request, the corresponding acceptance status indicator may be located. For example, if a key supplied in a request to access a value corresponds to extended key 352, version identifier 366 may be used to locate, via a mapping, the corresponding acceptance status indicator 362. If acceptance status indicator 362 indicates that the corresponding version of the collection of key-value pairs has been accepted, the value corresponding to key 370 may be returned. If the value of acceptance status indicator 362 indicates that the corresponding version of the collection has not yet been accepted, or if it indicates that the corresponding version has been rejected, index structure 382 may be searched further. This may be done by, for example, traverse to an extended key comprising the next version identifier 374. The value of acceptance status indicator 364 may then be examined to determine if that version of the collection has been accepted.

Although FIG. 3B depicts an index structure 382 that may be searched sequentially, various embodiments may employ alternate structures that permit searching using alternative access methods. Other structures may include those that permit access based on a subset of each extended key, for example those that would allow access to an extended key based on the value of a version identifier that is a component part of the extended key. In some embodiments, version identifiers may be embedded as a suffix or a prefix to the original key. Placement of the key as a suffix or prefix may be determined with respect to search efficiency. In particular, embodiments may place the version identifier into the extended key so that searches based on only the key portion of the extend key may be efficiently performed.

Various embodiments may also obscure the presence of the extended key from users of the key-value database management system. In other words, a client interacting with the key-value database management system may do so by specifying relevant keys, without any indication of version number.

In various embodiments, version information may be implied by the context in which an update is submitted. For example, updates may be provided in coherent sets of data, such as an update file. In some cases and embodiments, updates to a collection of data presented within the same file, or the same message may be presumed to correspond to a single version. A single file may also supply a complete updates to a first collection and a complete set of updates to a second collection. In some cases and embodiments, a data-providing entity may provide additional information identifying the version of the collection to which the updates should be applied.

In some cases, an update to a previously accepted version may be applied. In such cases, embodiments may return the version to an unaccepted state. Alternatively, embodiments may create a new version that is a clone of the prior accepted version, but with the update applied. Once the new version is accepted, its contents may be made accessible to a data-consuming entity.

Figure 4:
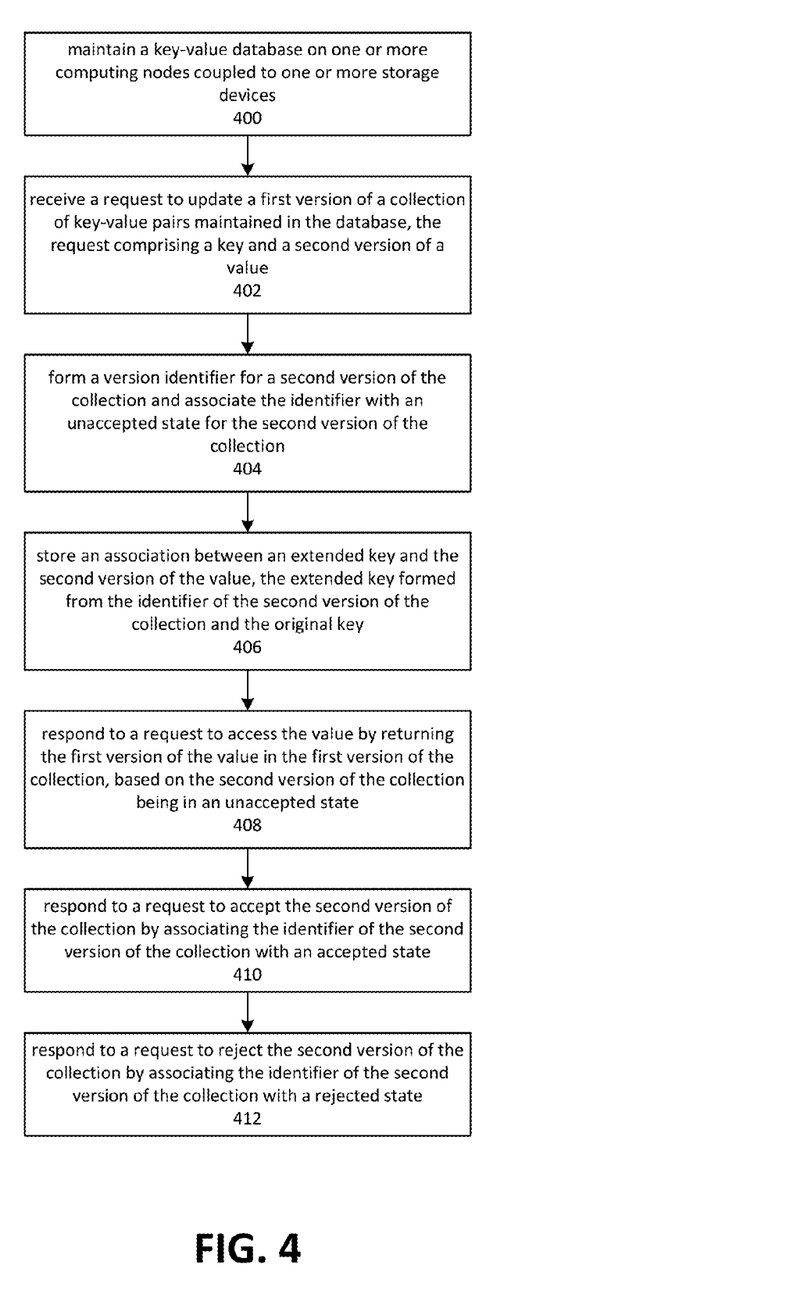
FIG. 4 is a flowchart depicting an embodiment of a process for providing controlled access to versioned collections of key-value pairs prior to acceptance or rollback of the collection.

FIG. 4 is a flowchart depicting an embodiment of a process for providing controlled access to versioned collections of key-value pairs prior to acceptance or rollback of the collection. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 400 depicts maintaining a key-value database on one or more computing nodes coupled to one or more storage devices. The one or more computing nodes may correspond to a distributed key-value database management system. Maintaining the key-value database may comprise storing and retrieving data on the one or more storage devices. The storage and retrieval may be performed by various processes executing on the computing nodes. Data may be divided between the nodes based on various partitioning schemes, such as horizontal partitioning, hash-key partitioning, range-key partitioning, and so forth.

Element 402 depicts receiving a request to update a first version of a collection of key-value pairs maintained by the database management system. The request may comprise a key that corresponds to a value. A key may function in a manner similar to a primary key in a relational database management system. The request may also comprise a second version of a value. A first value corresponding to the key may already exist in the first version of the collection, either as a materialized value or as a null value.

Element 404 depicts forming a version identifier for a second version of the collection, with which the second version of the value may be associated. The identifier of the second version of the collection may then be associated with information indicative of an unaccepted state.

Element 406 depicts storing an association between an extended key and the second version of the value. The extended key may be formed from the identifier of the second version of the collection and the original key. In some embodiments, the identifier of the second version of the collection may be included as a suffix or prefix to the original key. The extended key, rather than the original key, may then be used to store and retrieve the second version of the value.

Element 408 depicts responding to a request to access the value by returning the first version of the value, which is in the first version of the collection, when the second version of the collection is in an unaccepted state. This may be determined by using the original key to locate a corresponding extended key, extracting the prefixed collection version identifier, and then determining whether that version of the collection has been accepted.

Element 410 depicts responding to a request to accept the second version of the collection by associating the identifier of the second version of the collection with information indicative of an accepted state. Element 412 depicts responding to a request to reject the second version of the collection by associating the identifier of the second version of the collection with information indicative of a rejected state. Associating the second version with a rejected state may be described as performing a rollback of the various updates to the collection. In some cases, the number of updates associated with a particular version of a transaction, or more generally the number of updates associated with a metatransaction, may be large. However, all of the key-value pairs in the collection may be effectively rolled back by marking the collection as being rejected. Accordingly, this process may be performed efficiently. A background task may, in some cases and embodiments, delete key-value pairs that belong to collections, or more generally metatransactions, that have been rejected.

In various embodiments, a partial rejection may also be applied, in which case the rejected and non-rejected elements may be split into different versions. In some cases and embodiments, prior elements of a collection may be merged, so that the collection may be made complete. In other cases and embodiments, data missing from a new version of a collection may be supplied by a previous accepted version. In other words, a newly accepted version of a collection and a previously accepted version of a collection may be presented as a merged collection, even though no actual merging or copying of elements within the collection need actually occur.

In an embodiment, a key-value database management system may be supplied for processing data received from a partially trusted entity. The system may comprise one or more computing nodes communicatively coupled to a storage device, the one or more computing nodes maintaining a key-value database, the key-value database comprising a first version of a collection of key-value pairs, the first version of the collection comprising a first version of a value. The system may further comprise one or more memories having stored thereon computer-readable instructions that, upon execution by the one or more computing nodes, cause the system at least to: receive a first request to store a second version of the value, the request comprising a key and the second version of the value; associate an identifier of a second version of the collection with information indicative of an unaccepted state of the collection; store, on the storage device, a mapping between an extended key and the second version of the value, the extended key comprising the identifier of the second version of the collection and the key; in response to a second request to access the value, the request comprising the key, retrieve the first version of the value when the second version of the collection is associated with the information indicative of the unaccepted state, and retrieve the second version of the value when the second version of the collection is associated with an accepted state, wherein the retrieval of the first or second version of the value is based at least in part on locating the extended key using the key and using the identifier of the second version of the collection contained in the extended key; and in response to receiving a third request to accept the second version of the collection, associate the identifier of the second version of the collection with information indicative of the accepted state of the second version of the collection.

In a further embodiment, the system described above may further comprise one or more memories having stored thereon computer-readable instructions that, upon execution by the one or more computing devices, cause the system at least to add an entry to an index structure maintained on the one or more storage devices, the entry comprising the extended key, wherein the entry may be searched based on at least one of the identifier of the second version of the value and the key. For example, an index structure may comprise a traversable list of entries, each of which contains an extended key. The index structure may further comprise a mechanism for rapidly locating entries within the index. Assuming, for the purposes of the example, that an extended key comprises an original key as a prefix and a version identifier as a suffix, index entries beginning with the original key may be located. This subset of entries might then be scanned to identify an entry corresponding to a specific version of a collection of key-value pairs.

In another embodiment, a collection of data may be rolled back by associating the version of the collection with a rolled back state. A background task may also be employed to remove the rolled back data, if such data is no longer needed. Accordingly, the system described above may associate the second version of the collection with a rejected state, and execute a background task to delete key-value pairs associated with the second version of the collection. In various embodiments, the version information included in extended keys may be employed to locate the version of a value that corresponds to a collection from a particular point in time. Accordingly, the system described above may associate the first version of the collection with information indicative of a time; and associate the first version of the collection with information indicative of a rejected state, based at least in part on using the information indicative of the time to locate the first version of the collection.

In another embodiment, a partially trusted entity may control the formation of new versions of a collection of data. For example, a partially trusted entity may supply a stream of updates containing a version identifier and an identifier of a collection of key-value pairs. When the partially trusted entity supplies a new version identifier in the stream of updates, embodiments may form a new version of the collection. Accordingly, in various embodiments the identifier of a second version of a collection may be supplied by the partially trusted entity.

Figure 5:
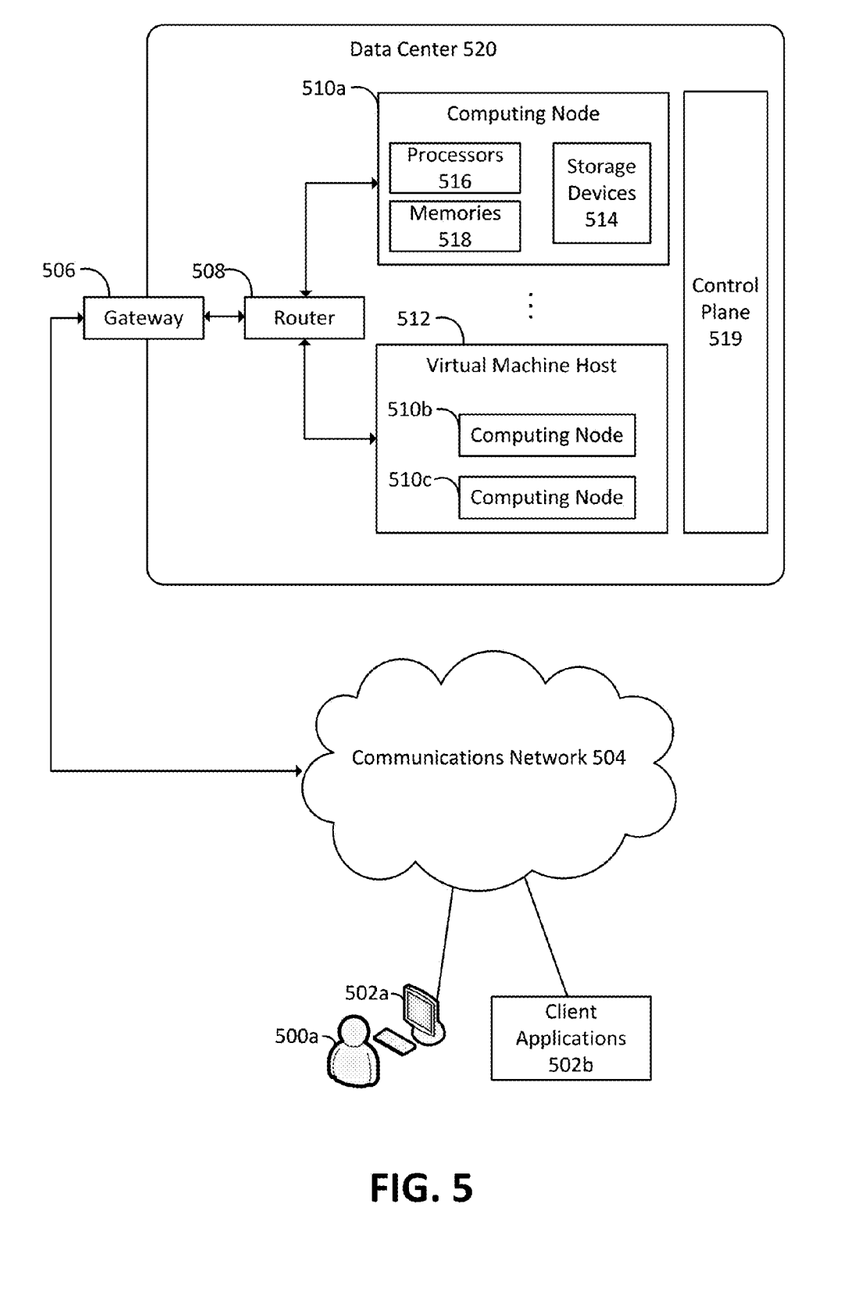
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500*a* may interact with various client applications, operating on any type of computing device 502*a*, to communicate over communications network 504 with processes executing on various computing nodes 510*a*, 510*b*, and 510*c* within a data center 520. Alternatively, client applications 502*b* may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510*a*, 510*b*, and 510*c*, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510*a*, 510*b*, and 510*c*. Some of these intermediate layers may themselves comprise processes executing on one or more of the computing nodes. Computing nodes 510*a*, 510*b*, and 510*c*, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510*a* is depicted as residing on physical hardware comprising one or more processors 516, one or more memories 518, and one or more storage devices 514. Processes on computing node 510*a* may execute in conjunction with an operating system or alternatively may execute as a bare-metal process that directly interacts with physical resources, such as processors 516, memories 518, or storage devices 514.

Computing nodes 510*b* and 510*c* are depicted as operating on virtual machine host 512, which may provide shared access to various physical resources, such as physical processors, memory, and storage devices. Any number of virtualization mechanisms might be employed to host the computing nodes.

A control plane 519 may comprise a computing node configured to coordinate or manage operations of other computing resources in data center 520, such as computing nodes 510*a*, 510*b*, and 510*c*, as well as virtual machine host 512. A control plane 519 may also manage aspects of the configuration and operation of gateway 506 and router 508, as well as various other network components not explicitly depicted in FIG. 5. Embodiments may include an management interface in control plane 519 for managing control functions, such as creating new instances of a computing node, such as computing nodes 510*a*, 510*b*, or 510*c*, adding or configuring a virtual machine host 612, configuring network configuration of router 508, and so on. Embodiments of a control plane 519 may also comprise mechanisms for configuring services or controlling operation of services within data center 520.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
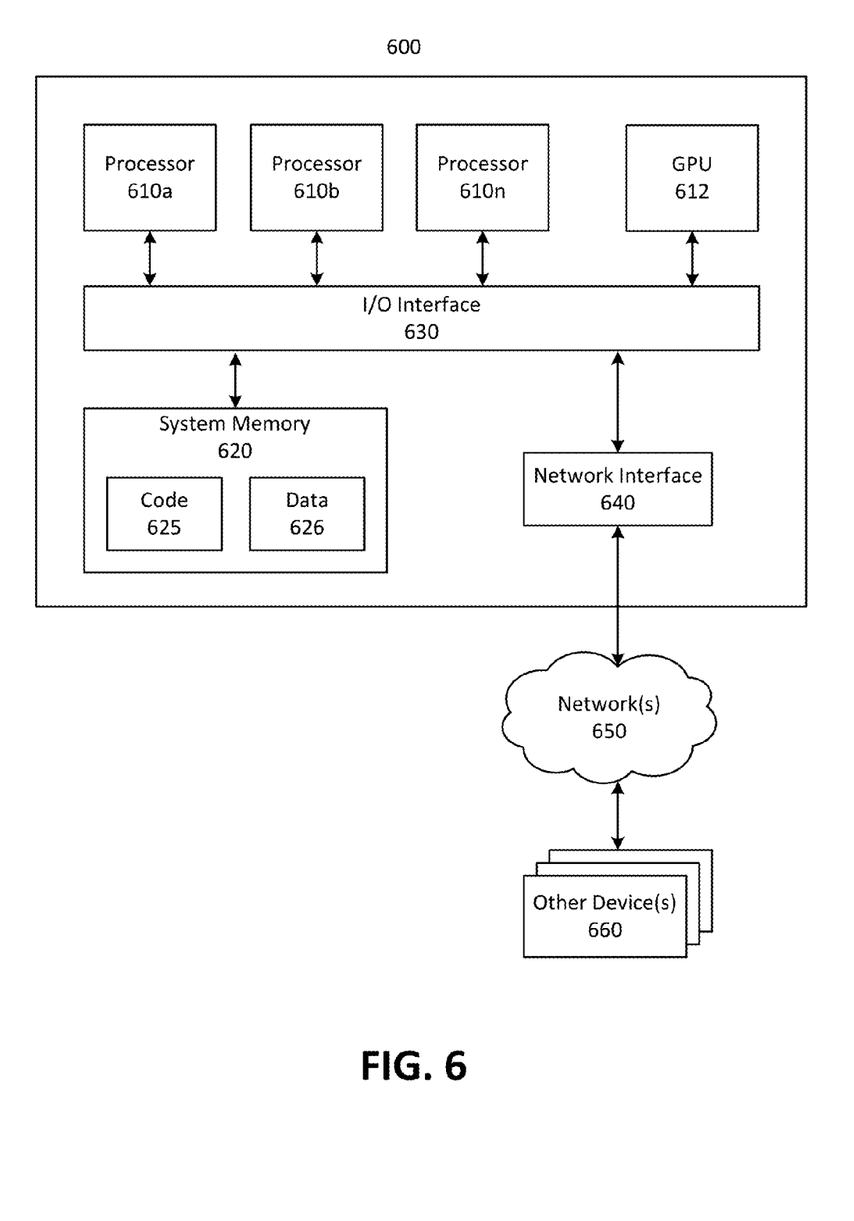
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610*a*, 610*b*, and/or 610*n* (which may be referred herein singularly as a processor 610 or in the plural as the processors 610) coupled to a system memory 620 via an input/output ("I/O") interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures ("ISAs"), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A non-transitory computer-readable storage medium having stored thereon instructions that, upon execution by one or more computing devices, cause the one or more computing devices at least to:
maintain on one or more storage devices a first version of a collection of key-value pairs, first version of the collection comprising a first version of a value;
store a second version of the value in response to a request comprising a key and the second version of the value;
associate an identifier of a second version of the collection with information indicative of an unaccepted state of the collection;
store, on the storage device, a mapping between an extended key and the second version of the value, the extended key comprising the identifier of the second version of the collection and the key;
access the first version of the value based at least in part on using the extended key to determine that the second version of the value is associated with the unaccepted state, wherein the extended key is identified by a subset of the extended key corresponding to the key;
associate the identifier of the second version of the collection with information indicative of an accepted state in response to receiving information indicative of the second version of the collection being accepted; and
access the second version of the value based at least in part on using the extended key to determine that the second version of the value is associated with an accepted state.

2. The non-transitory computer-readable storage medium of claim 1, comprising further instructions that, upon execution by the one or more computing devices, cause the one or more computing devices to at least:
add an entry to an index structure maintained on the one or more storage devices, the entry comprising the extended key; and
access the second version of the value by traversing the index structure and locating the entry based at least in part on the identifier of the second version of the value and the key.

3. The non-transitory computer-readable storage medium of claim 2, comprising further instructions that, upon execution by the one or more computing devices, cause the one or more computing devices to at least:
access the first and second versions of the value by traversing the index structure and locating the first and second versions of the value using the key.

4. The non-transitory computer-readable storage medium of claim 1, comprising further instructions that, upon execution by the one or more computing devices, cause the one or more computing devices to at least:
associate the first version of the collection with information indicative of a time; and
associate the first version of the collection with information indicative of a rejected state, based at least in part on using the information indicative of the time to locate the first version of the collection.

5. The non-transitory computer-readable storage medium of claim 1, comprising further instructions that, upon execution by the one or more computing devices, cause the one or more computing devices to at least:
in response to receiving information indicative of a partial acceptance of the second version of the collection, the partial acceptance including the value, form an additional version of the collection by at least forming an additional extended key comprising an identifier of the additional version of the collection and the key; and
associate the identifier of the additional version of the collection with an accepted state.

6. The non-transitory computer-readable storage medium of claim 1, comprising further instructions that, upon execution by the one or more computing devices, cause the one or more computing devices to at least:
store the mapping between the extended key and the second version of the value in a first transaction context; and
store a mapping between an additional extended key and an additional version of the value in a second transaction context, wherein the additional extended key comprises the identifier of the second version of the collection.

7. The non-transitory computer-readable storage medium of claim 1, wherein the second version of the collection of key-value pairs corresponds to a plurality of updates to the first version of the collection of key-value pairs, the plurality of updates transmitted by a partially trusted entity.

8. The non-transitory computer-readable storage medium of claim 1, comprising further instructions that, upon execution by the one or more computing devices, cause the one or more computing devices to at least:
cause a rollback of updates associated with the second version of the collection by at least associating the identifier of the second version of the collection with information indicative of a rejected state of the collection.

9. The non-transitory computer-readable storage medium of claim 8, comprising further instructions that, upon execution by the one or more computing devices, cause the one or more computing devices to at least:
execute a background task to delete key-value pairs associated with the second version of the collection, based at least in part on the identifier of the second version of the collection being associated with the rejected state.

10. A method for performing a metatransactional commit on data received from a partially trusted entity, the method comprising:
maintaining on one or more storage devices a first version of a collection of key-value pairs, the first version of the collection comprising a first version of a value;
storing a second version of the value in response to a request comprising a key and the second version of the value;
associating an identifier of a second version of the collection with information indicative of an unaccepted state of the collection;
storing, on the one or more storage devices, a mapping between an extended key and the second version of the value, the extended key comprising the identifier of the second version of the collection and the key;
accessing the first version of the value based at least in part on using the extended key to determine that the second version of the value is associated with the unaccepted state, wherein the extended key is identified by a subset of the extended key corresponding to the key;
associating the identifier of the second version of the collection with information indicative of an accepted state in response to receiving information indicative of the second version of the collection being accepted; and accessing the second version of the value based at least in part on using the extended key to determine that the second version of the value is associated with an accepted state.

11. The method of claim 10, further comprising:

adding an entry to an index structure maintained on the one or more storage devices, the entry comprising the extended key;

accessing the second version of the value by traversing the index structure and locating the entry based at least in part on the identifier of the second version of the value and the key; and accessing the first and second versions of the value by traversing the index structure and locating the first and second versions of the value using the key.

12. The method of claim 10, further comprising:

associating the first version of the collection with information indicative of a time; and associating the first version of the collection with information indicative of the trusted entity rejecting the first version of the collection, based at least in part on using the information indicative of the time to locate the first version of the collection.

13. The method of claim 10, further comprising:

receiving, from a trusted entity data indicative of a partial acceptance of the second version of the collection, the data including the value;

forming an additional version of the collection by at least forming an additional extended key comprising an identifier of the additional version of the collection and the key; and associating the identifier of the additional version of the collection with information indicative of an accepted state.

14. The method of claim 10, further comprising:

associating the identifier of the second version of the collection with information indicative of a rejected state of the collection.

15. The method of claim 10, further comprising:

permitting access to the second version of the value when the first version of the collection is associated with the unaccepted state, based at least in part on the access being requested by the trusted entity.

16. A system comprising:

at least one processor; and at least one memory having stored thereon computer-readable instructions that, upon execution by the at least one processor, cause the system at least to:

store a first version of a value in a first version of a collection of key-value pairs;

store a second version of the value in a second version of the collection of key-value pairs, the second version of the collection stored with information indicative of an unaccepted state of the second version of the collection;

store a mapping between an extended key and the second version of the value, the extended key comprising an identifier of the second version of the collection and a key associated with the second version of the value;

access the first version of the value based at least in part on using the extended key to determine that the second version of the value is associated with the unaccepted state;

store information indicative of an accepted state of the second version of the collection; and access the second version of the value based at least in part on using the extended key to determine that the second version of the value is associated with the accepted state.

17. The system of claim 16, wherein the at least one memory has stored thereon further computer-executable instructions that, upon execution by the at least one processor, cause the system at least to:

split the second version of the collection into a plurality of collections based at least in part on a partial rejection of the second version of the collection.

18. The system of claim 16, wherein the second version of the value is stored in response to a request from a partially trusted entity.

19. The system of claim 16, wherein a request to accept the second version of the collection is associated with a trusted entity.

20. The system of claim 16, wherein the at least one memory has stored thereon further computer-executable instructions that, upon execution by the at least one processor, cause the system at least to:

store information indicative of a rejected state of the second version of the collection.

* * * * *